United States Patent
Lee et al.

(10) Patent No.: US 11,898,680 B2
(45) Date of Patent: Feb. 13, 2024

(54) COUPLING ASSEMBLY FOR PIPE BRANCHING

(71) Applicant: NEW ASIAJOINT CO., LTD., Yeoju-si (KR)

(72) Inventors: Sang Heon Lee, Seoul (KR); Dong Il Han, Yeoju-si (KR)

(73) Assignee: NEW ASIAJOINT CO., LTD., Yeoju-si (KR)

( * ) Notice: Subject to any disclaimer, the term of this patent is extended or adjusted under 35 U.S.C. 154(b) by 32 days.

(21) Appl. No.: 17/611,807

(22) PCT Filed: May 14, 2020

(86) PCT No.: PCT/KR2020/006375
§ 371 (c)(1),
(2) Date: Nov. 16, 2021

(87) PCT Pub. No.: WO2020/235870
PCT Pub. Date: Nov. 26, 2020

(65) Prior Publication Data
US 2022/0235892 A1    Jul. 28, 2022

(30) Foreign Application Priority Data
May 17, 2019  (KR) .......................... 10-2019-0057933
Dec. 24, 2019 (KR) .......................... 10-2019-0173782

(51) Int. Cl.
*F16L 41/06*    (2006.01)
*F16L 3/10*     (2006.01)

(52) U.S. Cl.
CPC ............. *F16L 41/06* (2013.01); *F16L 3/1091* (2013.01)

(58) Field of Classification Search
CPC .................................... F16L 17/02; F16L 41/06
See application file for complete search history.

(56) References Cited

U.S. PATENT DOCUMENTS 2,946,518 A * 7/1960 Wahlin ...................... B05B 1/14
                                                    239/266
4,073,513 A * 2/1978 Blakeley ................. F16L 41/12
                                                    285/136.1
4,157,195 A * 6/1979 Costanzo ................ F16L 41/08
                                                    285/198

(Continued)

FOREIGN PATENT DOCUMENTS

| JP | H09-209419 A | 8/1997 |
| JP | 2000-291872 A | 10/2000 |
| KR | 10-0740590 B1 | 7/2007 |

OTHER PUBLICATIONS

English Search Report in International Application No. PCT/KR2020/006375—in 2 pages (dated Aug. 13, 2020).

*Primary Examiner* — Reinaldo Sanchez-Medina
(74) *Attorney, Agent, or Firm* — Knobbe, Martens, Olson & Bear, LLP

(57) ABSTRACT

The present invention relates to a coupling assembly for pipe branching and, more specifically, to a coupling assembly for pipe branching, which: can reduce assembly man-hours; has a simplified structure and thus can reduce construction costs; and can effectively prevent leakage of a branch fluid even when the diameter of a branch hole formed through an inflow pipe is increased in order to enable the increase in the internal flow rate of a branch pipe through which a fluid is supplied to a sprinkler.

6 Claims, 14 Drawing Sheets

(56) References Cited

U.S. PATENT DOCUMENTS

| | | | |
|---|---|---|---|
| 4,613,171 A | 9/1986 | Corcoran | |
| 6,412,824 B2* | 7/2002 | Kunsman | F16L 41/12 |
| | | | 285/198 |
| 11,525,530 B2* | 12/2022 | Borawski | F16L 41/12 |
| 2002/0000719 A1 | 1/2002 | Kunsman | |
| 2017/0122474 A1* | 5/2017 | Borawski | F16L 17/02 |

* cited by examiner (a)

(b)

(a)

(b)

COUPLING ASSEMBLY FOR PIPE BRANCHING

TECHNICAL FIELD

The present invention relates to a coupling assembly for pipe branching and, more specifically, to a coupling assembly for pipe branching, which allows assembly man-hours to be reduced, has a simplified structure to reduce a construction cost, and effectively prevents leakage of a branching fluid even when a diameter of a branch hole formed in an inflow pipe is increased in order to increase a flow rate in a branch pipe through which the fluid is supplied to a sprinkler.

BACKGROUND ART

Generally, sprinklers, which include sensors for detecting fires occurring around ceilings to extinguish the fires early by automatically sprinkling high-pressure fluids, are installed on each floor in buildings such as apartment houses.

To this end, a main pipe through which a fluid is supplied from the outside is installed, inflow pipes, on which a plurality of sprinklers are installed, are installed to communicate with the main pipe, and branch pipes for supplying the fluid to the sprinkles are installed on the inflow pipes.

However, in the conventional case, a branch pipe is installed in a manner of being welded to a branch hole formed in an inflow pipe in order to install the inflow pipe and the branch pipe that communicate with each other, or the inflow pipe and the branch pipe are installed on a T-pipe in which branches are formed to fluidly communicate with each other. Such a manner has problems in that many assembly man-hours and the large number of parts are required, and thus a construction cost is wasted.

In addition, when a diameter of the branch hole formed in the inflow pipe is increased in order to increase a flow rate of a fluid supplied to a sprinkler, there is a problem in that the fluid leaks.

Accordingly, there is a need for reduction of the problems.

DISCLOSURE

Technical Tasks

The present invention is directed to providing a coupling assembly for pipe branching which allows assembly man-hours to be reduced and of which a structure is simplified to reduce a construction cost.

In addition, the present invention is directed to providing a coupling assembly for pipe branching which is capable of effectively preventing leakage of a branching fluid even when a diameter of a branch hole installed in an inflow pipe is increased in order to increase a flow rate in a branch pipe through which the fluid is supplied to a sprinkler.

Technical Solution

One aspect of the present invention provides a coupling assembly including an inflow pipe in which a branch hole for branching of an introduced fluid is formed, a branch pipe which communicates with the inflow pipe so that the fluid branched off through the branch hole flows, and a coupler which connects the inflow pipe and the branch pipe, wherein the coupler includes a body part surrounding a circumference of the branch hole and a gasket part disposed between the body part and an outer circumferential surface of the inflow pipe and pressed by the body part to prevent leakage of the fluid being branched off, and a degree of pressurization against the gasket part by the body part increases in a direction away from the branch hole.

A base, which is pressed by a pressing surface formed on the body part to prevent fluid leakage, may be formed on the gasket part, and a reinforcement surface may be formed on the base to increase the degree of pressurization by the pressing surface in the direction away from the branch hole.

A thickness of the reinforcement surface may increase in the direction away from the branch hole.

A reinforcement protrusion extending in an axial direction of the branch pipe may be formed on the base, an insertion groove into which the reinforcement protrusion is inserted may be formed in the body part, and the pressing surface, which presses the reinforcement protrusion, may be formed on an inner circumferential surface of the insertion groove.

An expansion groove extending in a circumferential direction of the branch hole and a supply path which guides the fluid so that the fluid is introduced into the expansion groove may be formed in the reinforcement protrusion.

The expansion groove may include a first expansion groove which is open in a circumferential direction of the branch pipe, and the supply path may include a first supply path which guides the fluid so that the fluid is introduced into the first expansion groove.

The expansion groove may include a second expansion groove which is open in the axial direction of the branch pipe, and the supply path may include a second supply path which guides the fluid so that the fluid is introduced into the second expansion groove.

The expansion groove may include a first expansion groove which is open in a circumferential direction of the branch pipe and a second expansion groove which is open in the axial direction of the branch pipe, and the supply path may include a first supply path which guides the fluid so that the fluid is introduced into the first expansion groove and a second supply path which guides the fluid so that the fluid is introduced into the second expansion groove.

An extension rib extending in an axial direction of the inflow pipe may be formed on the base, a reinforcement part into which the extension rib is inserted may be formed in the body part, and the pressing surface which presses the extension rib may be formed in an inner circumferential surface of the reinforcement part.

A support surface extending in a radially inward direction of the inflow pipe may be formed on the reinforcement part, and the support surface may be pressed against and supported by the outer circumferential surface of the inflow pipe.

Advantageous Effects

According to the present invention, since a coupling assembly for pipe branching having a structure as described above includes a body part surrounding a branch hole around an inflow pipe, a fixing part opposite to the body part, and a gasket part for preventing fluid leakage, assembly man-hours and a construction cost are reduced.

In addition, since a degree of pressurization against the gasket part by the body part increases in a direction away from the branch hole, even when a diameter of the branch hole formed in the inflow pipe increases, the leakage of a branching fluid can be effectively prevented.

In addition, since a first cut surface and a second cut surface are formed so that a lower end of a flange is positioned above a center of the inflow pipe, when a coupler is coupled, the flange is moved by a fastening force of the fixing part in downward and radially inward directions at the same time to press the gasket part, and thus the leakage of the branching fluid can be more effectively prevented.

In addition, since a reinforcement surface, of which a thickness increases in the direction away from the branch hole, is formed on the gasket part, the leakage of the branching fluid can be more effectively prevented.

In addition, since a reinforcement protrusion extending in an axial direction of the branch pipe is formed, and an expansion groove, which is expanded when the fluid is introduced, is formed in the reinforcement protrusion, the leakage of the fluid can be more effectively prevented.

DESCRIPTION OF DRAWINGS

FIGS. 7 to 9 are views illustrating a gasket part included in the coupling assembly according to another embodiment of the present invention, wherein FIG. 7 is a perspective view illustrating the gasket part, (a) of FIG. 8 is a front view illustrating the gasket part, (b) of FIG. 8 is a side view illustrating the gasket part, and FIG. 9 is a cross-sectional view taken along line I-I of FIG. 7.

MODES OF THE INVENTION

Figure 1:
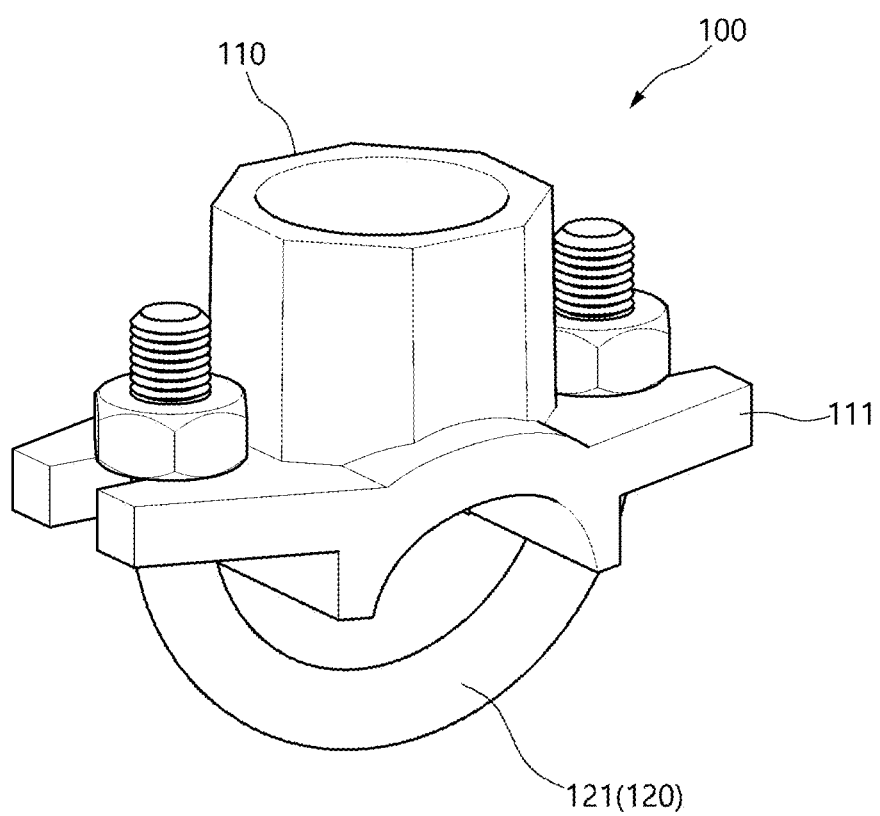
FIG. 1 is a perspective view illustrating a coupling assembly according to one embodiment of the present invention.

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Figure 2:
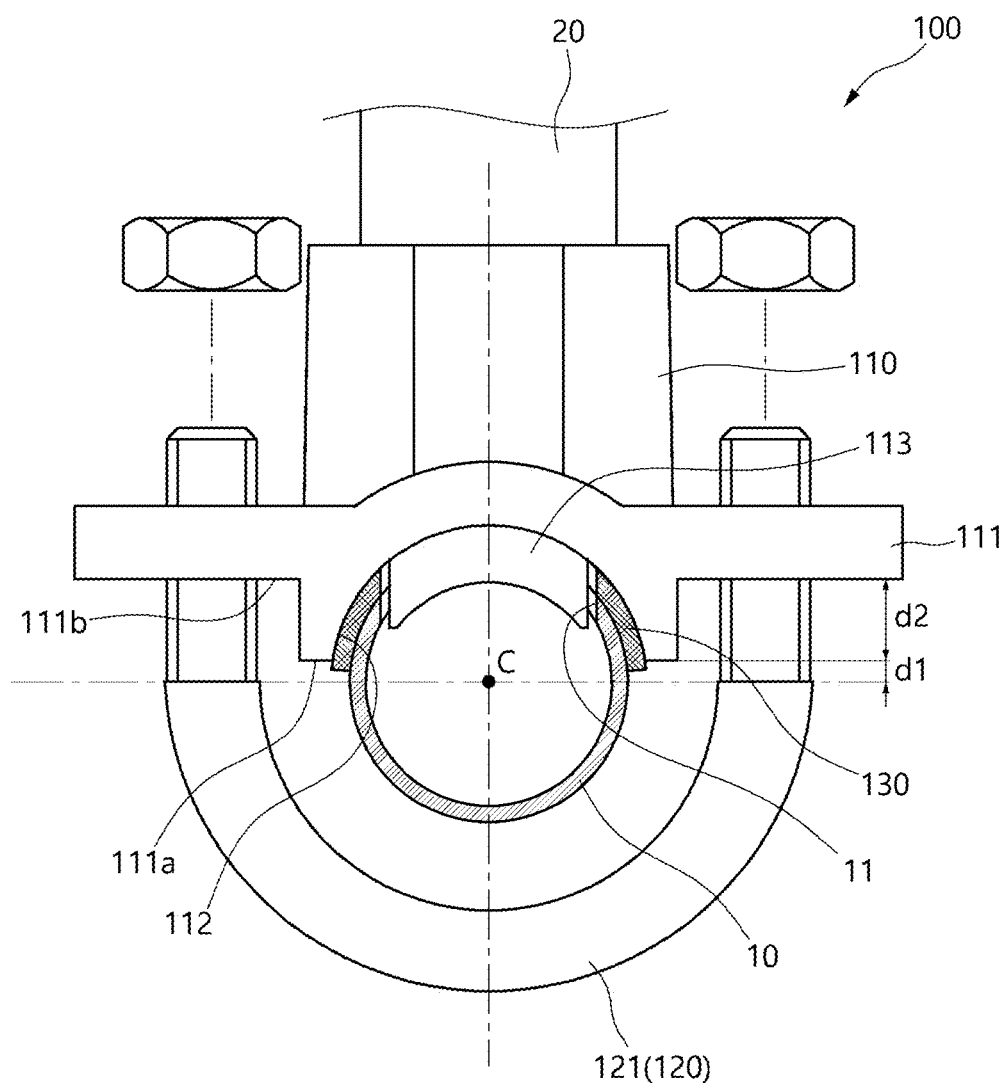
FIG. 2 is a view illustrating an uncoupled state of the coupling assembly according to one embodiment of the present invention.
Figure 3:
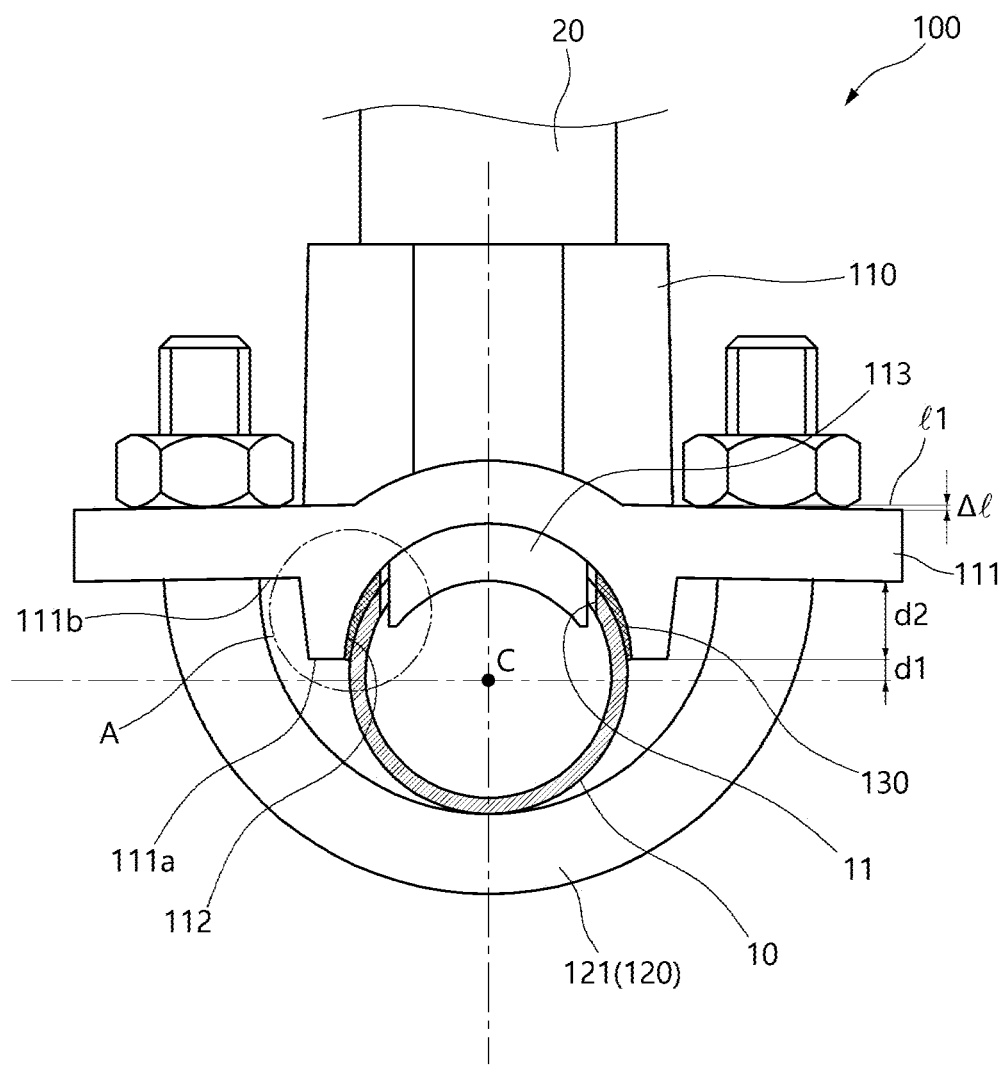
FIG. 3 is a view illustrating a coupled state of the coupling assembly according to one embodiment of the present invention.
Figure 4:
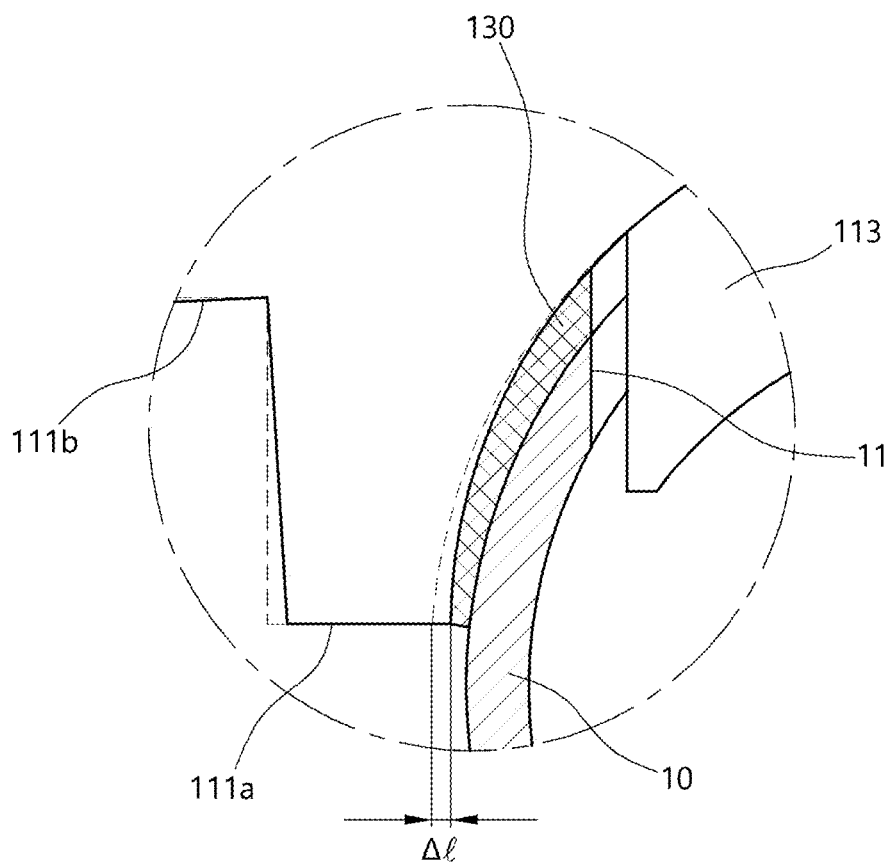
FIG. 4 is an enlarged view illustrating a region A of FIG. 3.
Figure 5:
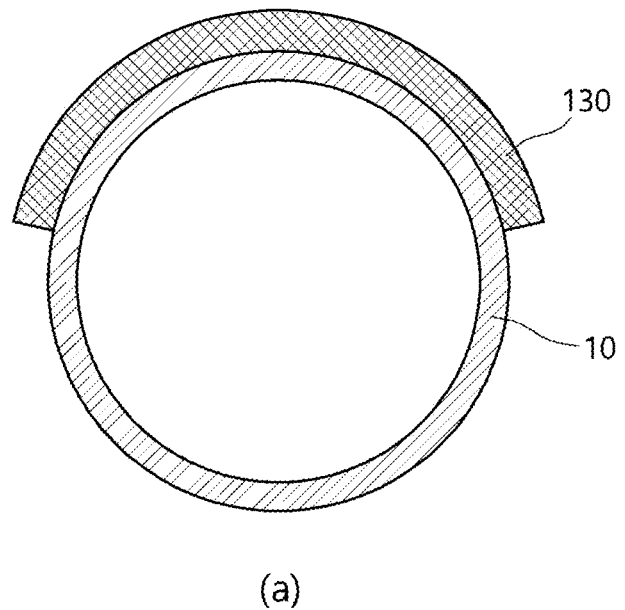
FIG. 5 shows views illustrating states in which a gasket part is pressed in a coupling process of the coupling assembly according to one embodiment of the present invention, wherein (a) of FIG. 5 is the view illustrating the state before the coupling, and (b) of FIG. 5 is the view illustrating the state after the coupling.
Figure 5:
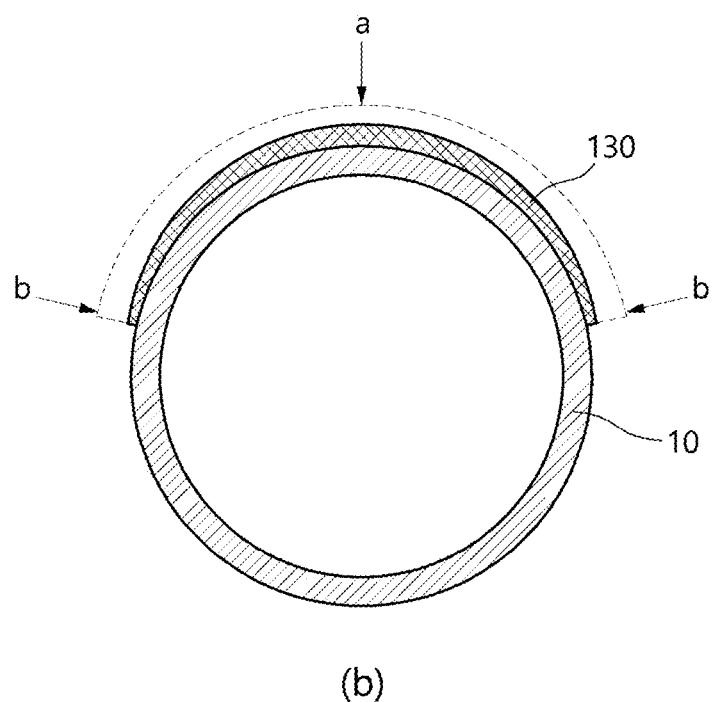
Figure 6:
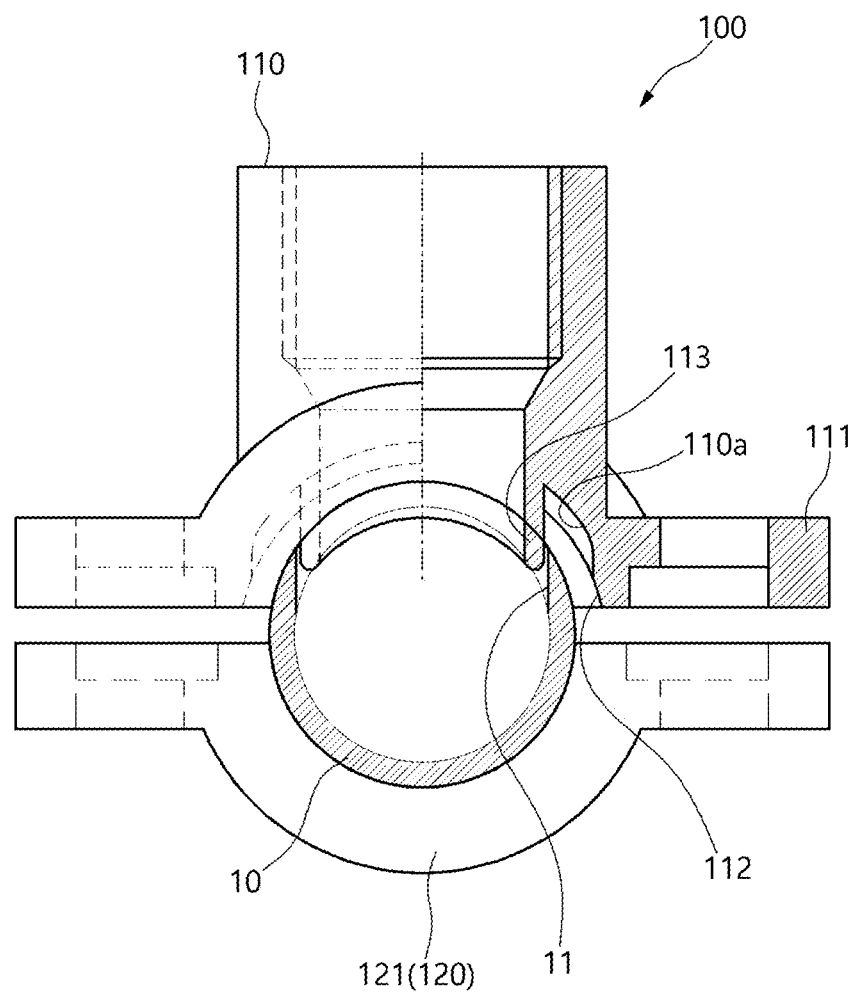
FIG. 6 is a cross-sectional view illustrating a coupling assembly according to another embodiment of the present invention, that is, a view illustrating a state in which the coupling assembly is cut in a direction perpendicular to an axial direction of an inflow pipe.
Figure 7:
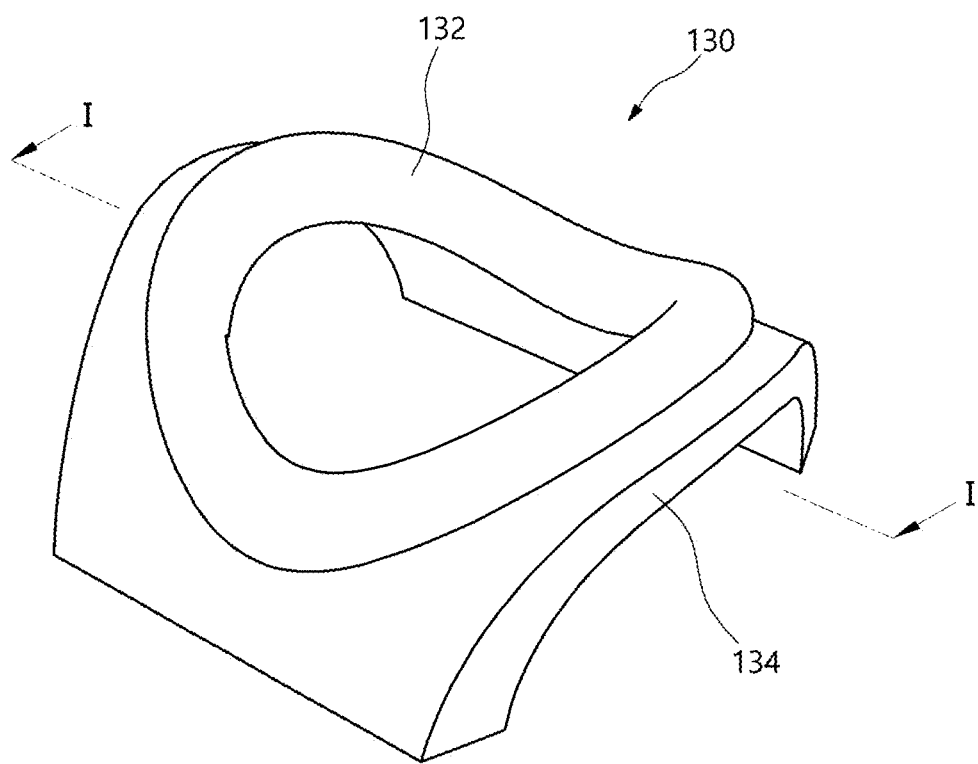
Figure 8:
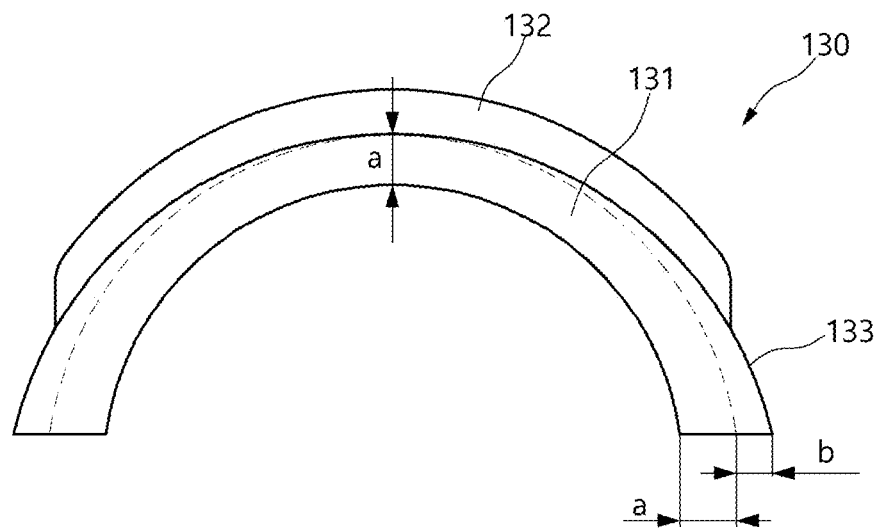
Figure 8:
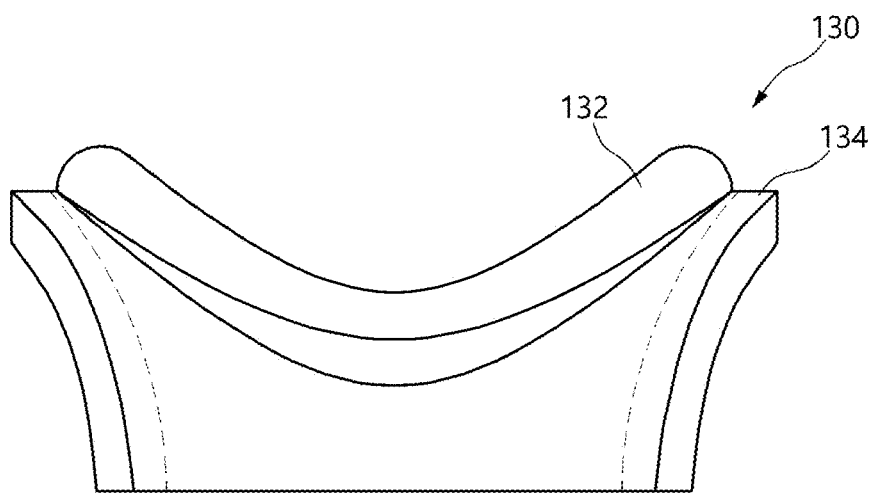
Figure 9:
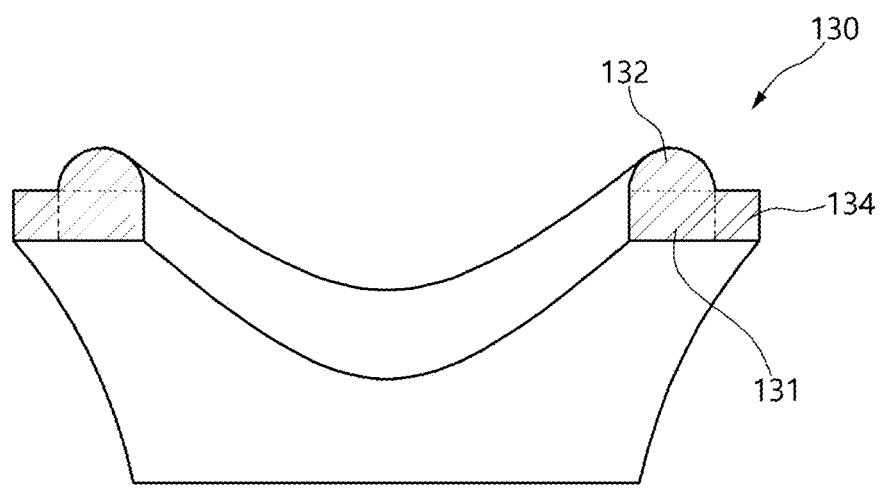
Figure 11:
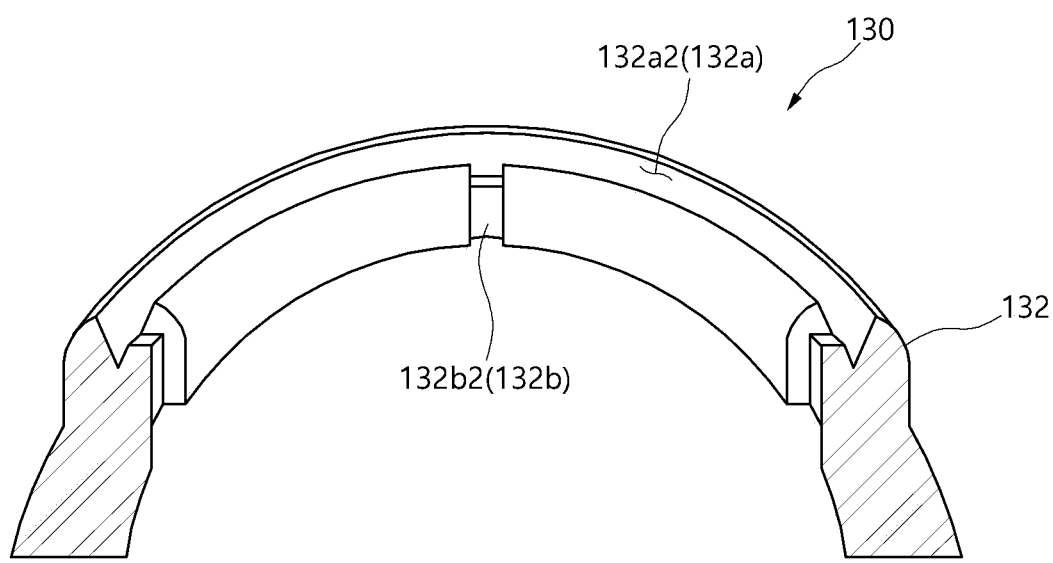
Figure 12:
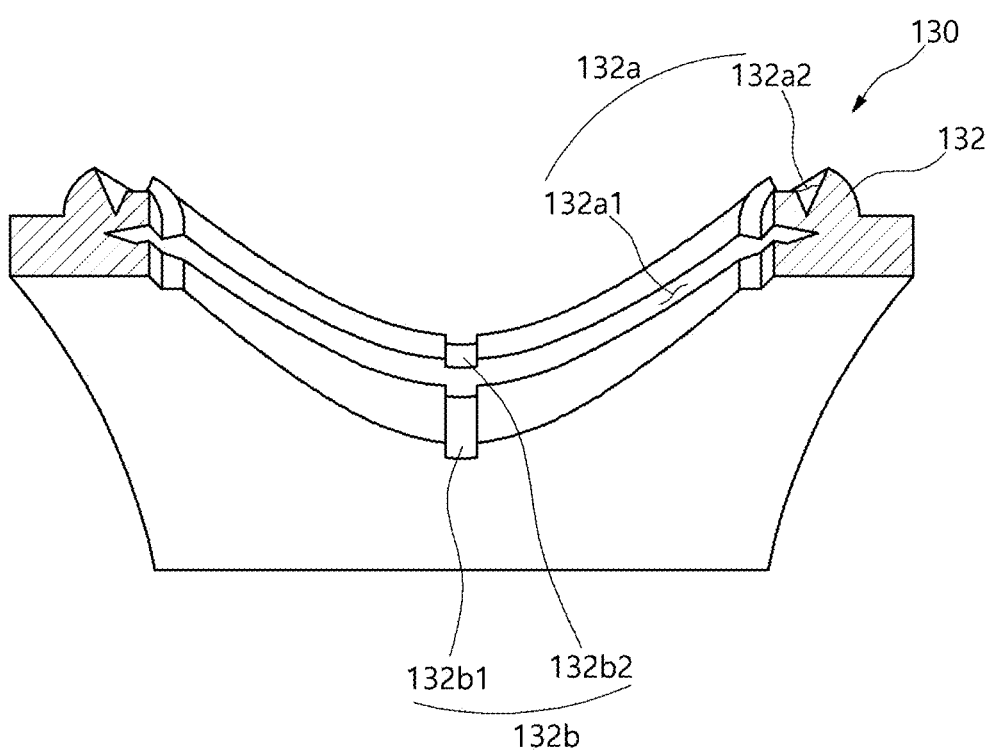
Figure 13:
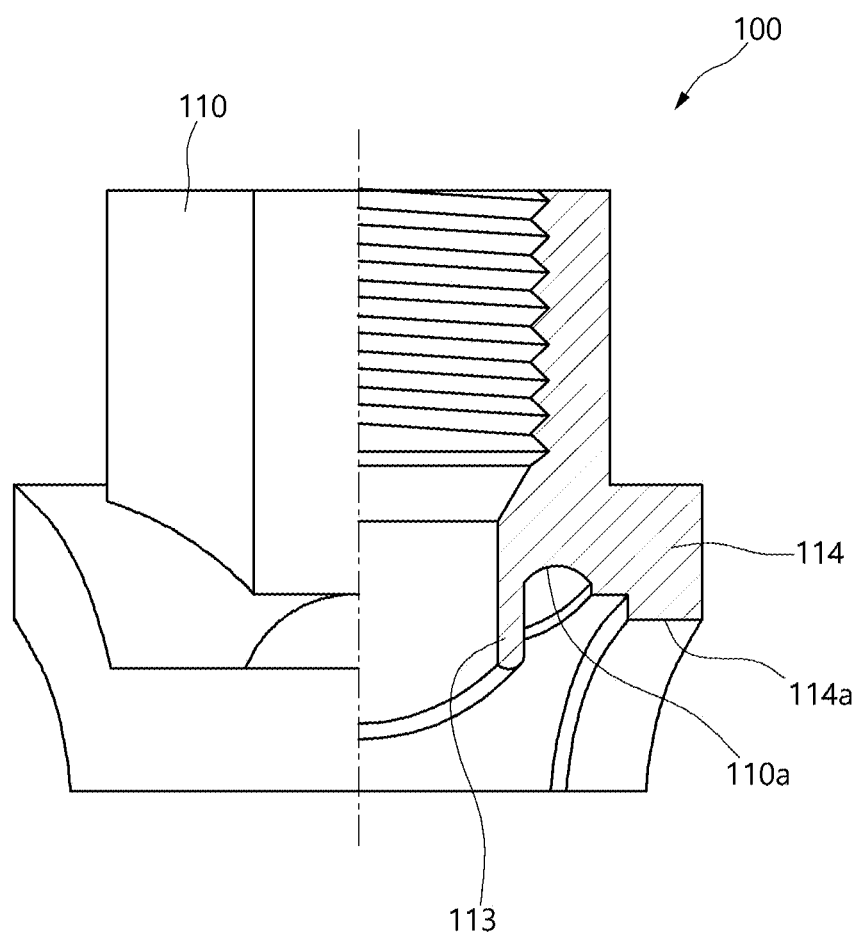
FIG. 13 is a cross-sectional view illustrating the coupling assembly according to another embodiment of the present invention, that is, a view illustrating a state in which the coupling assembly is cut in the direction perpendicular to the axial direction of the inflow pipe.
Figure 14:
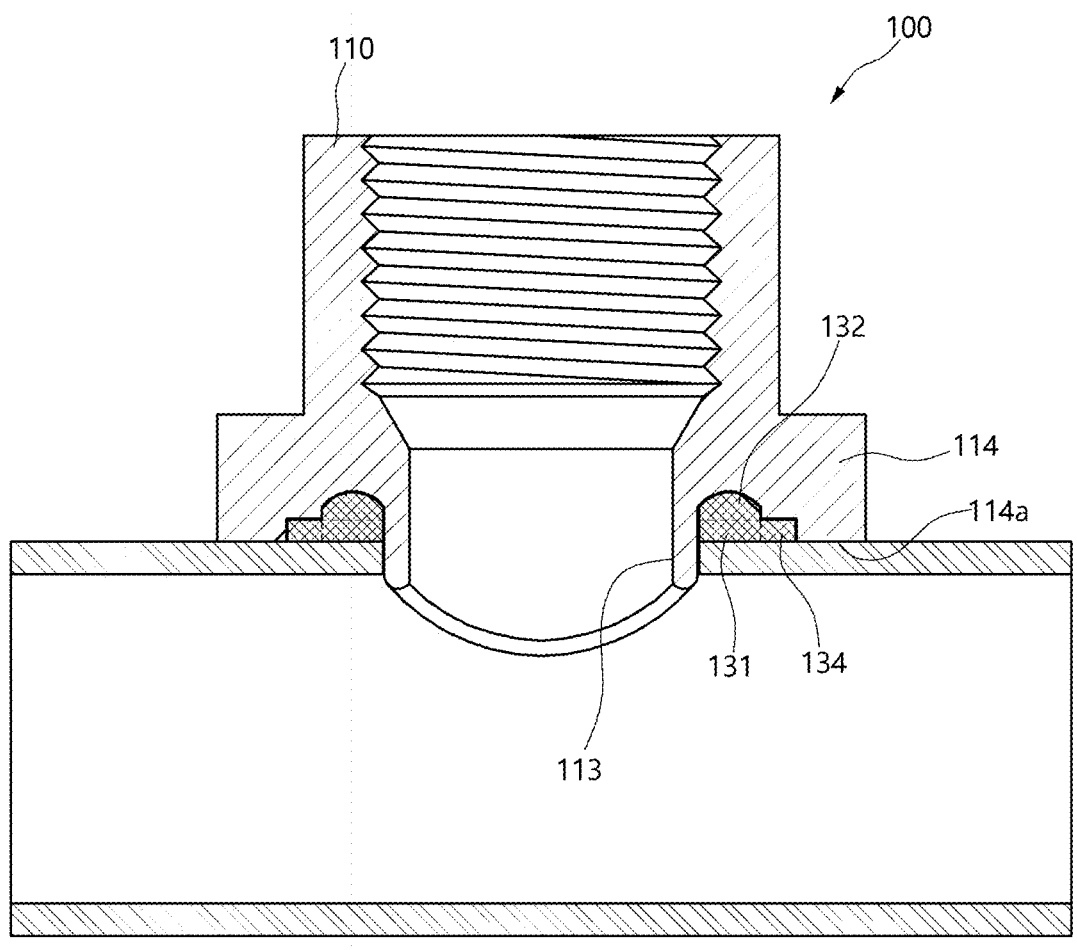
FIG. 14 is a cross-sectional view illustrating a coupled state of the coupling assembly of FIG. 13 and a pipe.

FIG. 1 is a perspective view illustrating a coupling assembly according to one embodiment of the present invention, FIG. 2 is a view illustrating an uncoupled state of the coupling assembly according to one embodiment of the present invention, FIG. 3 is a view illustrating a coupled state of the coupling assembly according to one embodiment of the present invention, FIG. 4 is an enlarged view illustrating a region A of FIG. 3, FIG. 5 shows views illustrating states in which a gasket part is pressed in a coupling process of the coupling assembly according to one embodiment of the present invention, wherein (a) of FIG. 5 is the view illustrating the state before the coupling, (b) of FIG. 5 is the view illustrating the state after the coupling, FIG. 6 is a cross-sectional view illustrating a coupling assembly according to another embodiment of the present invention, that is, a view illustrating a state in which the coupling assembly is cut in a direction perpendicular to an axial direction of an inflow pipe, FIGS. 7 to 9 are views illustrating a gasket part included in the coupling assembly according to another embodiment of the present invention, wherein FIG. 7 is a perspective view illustrating the gasket part, (a) of FIG. 8 is a front view illustrating the gasket part, (b) of FIG. 8 is a side view illustrating the gasket part, and FIG. 9 is a cross-sectional view taken along line I-I of FIG. 7, FIGS. 10 to 12 are cross-sectional views illustrating various gasket parts included in a coupling assembly according to still another embodiment of the present invention, FIG. 13 is a cross-sectional view illustrating the coupling assembly according to another embodiment of the present invention, that is, a view illustrating a state in which the coupling assembly is cut in the direction perpendicular to the axial direction of the inflow pipe, and FIG. 14 is a cross-sectional view illustrating a coupled state of the coupling assembly of FIG. 13 and a pipe.

As illustrated in FIGS. 1 to 3, the coupling assembly according to the present invention includes an inflow pipe 10 in which a branch hole 11 for branching of an introduced fluid is formed, a branch pipe 20 communicating with the inflow pipe 10 so that the fluid, which branches off through the branch hole 11, flows, and a coupler 100 which connects the inflow pipe 10 and the branch pipe 20, the coupler 100 includes a body part 110 surrounding a circumference of the branch hole 11 and a gasket part 130 which is disposed between the body part 110 and an outer circumferential surface of the inflow pipe 10 and pressed by the body part 110 to prevent leakage of a branching fluid.

In this case, since a fixing part 120, which is disposed at a side opposite to the body part 110 with respect to the inflow pipe 10 and fixes the body part 110 to the inflow pipe 10, is provided, and the body part 110 surrounding the circumference of the branch hole 11 is installed in a manner of being simply fixed using the fixing part 120, assembly man-hours and a construction cost are reduced, and since the gasket part 130 is provided between the body part 110 and the outer circumferential surface of the inflow pipe 10, the leakage of the fluid can be effectively prevented.

In this case, a diameter of the branch hole 11 formed in the inflow pipe 10 needs to be increased in order to increase a flow rate of the fluid supplied to the sprinkler, and even in this case, a degree of pressurization against the gasket part 130 by the body part 110 increases in a direction away from the branch hole 11 to effectively prevent the leakage of the fluid.

In this case, when the diameter of the branch hole 11 increases, a size of the gasket part 130 for preventing the leakage of the fluid also increases, and when the size of the gasket part 130 increases, it may be difficult to uniformly press the gasket part 130.

Particularly, when the size increases to an extent to which a circumference of the gasket part 130 is disposed close to a center c of the inflow pipe 10, it may be more difficult to uniformly press the gasket part 130. Here, the case in which the circumference of the gasket part 130 is disposed close to the center c of the inflow pipe 10 means a case in which, as illustrated in FIG. 2, the gasket part 130 is formed to extend from a portion, which is close the branch hole 11, of the inflow pipe 10, and the circumference of the gasket part 130 extending downward along a circumference of the inflow pipe 10 is disposed close to a line passing through the center c of the inflow pipe 10.

That is, this is because, when the body part 110 is fixed to the inflow pipe 10 using the fixing part 120 in this case, since a fastening force of the fixing part 120 is vertically applied, the gasket part 130 disposed close to the branch hole 11 effectively seals the circumference of the branch hole 11 using the vertical fastening force, but the gasket part 130 extending downward to be disposed close to the center c of the inflow pipe 10 is not effectively pressed even when the vertical fastening force is applied.

Accordingly, as described above, when the degree of pressurization against the gasket part 130 by the body part 110 increases in the direction away from the branch hole 11, even in the case in which the size increases to the extent to which the circumference of the gasket part 130 is disposed close to the center c of the inflow pipe 10, the leakage of the branching fluid can be effectively prevented.

In this case, as illustrated in FIGS. 1 to 3, a flange 111, through which the fixing part 120 passes to be coupled thereto, is formed on the body part 110, and a first cut surface 111$a$ may be formed on the flange 111 so that a lower end of the flange 111 is positioned above the center c of the inflow pipe 10. As described above, the meaning of the lower end of the flange 111 being positioned above the center c of the inflow pipe 10 is that, as illustrated in FIG. 2, the lower end of the flange 111 is disposed above the line passing through the center c of the inflow pipe 10 by a predetermined distance d1.

That is, when the first cut surface 111$a$ is formed on the flange 111 as described above, and the lower end of the flange 111 is positioned above the center c of the inflow pipe 10, and when the fastening force is applied using the fixing part 120, the fastening force is applied so that the flange 111 is moved in downward and radially inward directions at the same time, accordingly, the fastening force is applied to the gasket part 130 disposed close to the branch hole 11 only in a vertical direction and applied to the gasket part 130 disposed close to the center c of the inflow pipe 10 in the vertical and radially inward directions at the same time.

Since the radially inward fastening force increases in the direction away from the branch hole 11, the degree of pressurization against the gasket part 130 by the body part 110 increases in the direction away from the branch hole 11, and even when the size of the gasket part 130 increases, the fluid leakage can be effectively prevented.

In this case, as illustrated in FIGS. 1 to 3, a second cut surface 111$b$ may be formed on the flange 111 to be positioned above the first cut surface 111$a$ so that a step is formed therebetween. As described above, the meaning of the second cut surface 111$b$ being positioned above the first cut surface 111$a$ is that, as illustrated in FIG. 2, the second cut surface 111$b$ is disposed to be spaced upward from a line connecting the first cut surface 111$a$ by a predetermined distance d2.

When the second cut surface 111$b$ is formed as described above, since a thickness of a part of the flange 111 decreases, as illustrated in FIGS. 3 and 4, the flange 111 is easily deformed. Although the flange 111 is disposed at an initial position l1 before the fastening force is applied through the fixing part 120, when the fastening force is applied through the fixing part 120 in this state, while the flange 111 is deformed by a predetermined distance $\Delta$l, the flange 111 presses the gasket part 130 in the downward direction and presses the gasket part 130 in the radially inward direction as much as the predetermined distance $\Delta$l at the same time so that fluid leakage can be effectively prevented even when the size of the gasket part 130 increases.

Particularly, since the second cut surface 111$b$ is disposed above the first cut surface 111$a$, when the fastening force of the fixing part 120 is applied, the gasket part 130 is further easily pressed by the flange 111 in the radially inward direction.

In this case, a pressing surface 112 extending along the outer circumferential surface of the inflow pipe 10 to press the gasket part 130 is formed on the body part 110, and the gasket part 130 and the pressing surface 112 may be formed to extend to the lower end of the flange 111.

As described above, a part of the flange 111 is deformed by the fastening force of the fixing part 120 to press the gasket part 130 in the radially inward direction. That is, when the pressing surface 112 pressing the gasket part 130 is formed on the body part 110, and the gasket part 130 and the pressing surface 112 are formed to extend to the lower end of the flange 111, a pressing force due to the deformation of the flange 111 may be maximized, and thus, the fluid leakage can be effectively prevented.

In this case, a guide rib 113 inserted into a portion surrounded by an inner circumferential surface of the branch hole 11 may be formed on the body part 110, and thus, a position of the body part 110 may be stably fixed when the body part 110 is fixed. That is, even when an external force is applied to the body part 110, the body part 110 is prevented from rotating along the circumference of the inflow pipe 10.

In addition, since the guide rib 113 is formed, a flow of the branching fluid is effectively guided after the coupling using the fixing part 120.

In this case, the fixing part 120 includes a fixing member 121 which applies the fastening force in a state in which the fixing member 121 supports the outer circumferential surface of the inflow pipe 10, and a U bolt, which supports a part of the outer circumferential surface of the inflow pipe 10 in a manner of surrounding the part, may be used as the fixing member 121.

When the fixing member 121 is installed to pass through the flange 111 of the body part 110 and applies the fastening force thereto, the flange 111 moves downward and is deformed in the radially inward direction at the same time by the fastening force.

That is, as illustrated in (a) of FIG. 5, before the fastening force is applied, the thickness of the entire gasket part 130 is formed to be constant, after the fastening force is applied, as illustrated in (b) of FIG. 5, an upper end of the gasket part 130 is pressed downward, and in a direction toward a lower end of the gasket part 130, the gasket part 130 is pressed in the downward and radially inward directions at the same time to effectively prevent the fluid leakage.

In this case, an outer diameter of the inflow pipe 10 may be formed to be the same as an outer diameter of the branch pipe 20. That is, when the flow rate of the branching fluid needs to be increased, the branch pipe 20 having the outer diameter which is the same as the outer diameter of the inflow pipe 10 may be used, and in this case, although a diameter of the branch hole 11 is also increased, as described above, the fluid leakage can be effectively prevented by pressing the gasket part 130 in the downward and radially inward directions at the same time due to deformation of the flange 111 by the fastening force of the fixing part 120.

In this case, as illustrated in FIGS. 6 and 7, a coupler 100 includes a body part 110 which surrounds a circumference of a branch hole 11 and a gasket part 130 which prevents leakage of a branching fluid while being pressed by the body part 110. As illustrated in FIG. 8, a base 131, which prevents fluid leakage while being pressed by a pressing surface 112 formed on the body part 110, is formed on the gasket part 130, and a reinforcement surface 133 may be formed on the base 131 so that a degree of pressurization by the pressing surface 112 increases in a direction away from the branch hole 11.

That is, basically, while the base 131 is pressed by the pressing surface 112 of the body part 110, the leakage of the fluid is prevented. As described above, when a diameter of the branch hole 11 increases, since a size of the gasket part 130 for preventing the leakage of the fluid also increases so that it is difficult to uniformly press the gasket part 130, the reinforcement surface 133 is formed on the base 131 to increase the degree of pressurization by the pressing surface 112 in the direction away from the branch hole 11.

In this case, a thickness b of the reinforcement surface 133 may be formed to increase in the direction away from the branch hole 11.

That is, as illustrated in (a) of FIG. 8, a thickness a of the base 131 is formed to be constant, but, when the thickness b of the reinforcement surface 133 is formed to increase in the direction away from the branch hole 11, since the degree of pressurization by the pressing surface 112 increases in the direction away from the branch hole 11, the gasket part 130 may be uniformly pressed even when the size of the gasket part 130 increases, and thus the fluid leakage can be effectively prevented.

In this case, as illustrated in (b) of FIG. 8, a reinforcement protrusion 132 extending in an axial direction of a branch pipe 20 is formed on the base 131, and as illustrated in FIG. 6, an insertion groove 110a into which the reinforcement protrusion 132 is inserted is formed in the body part 110, and the pressing surface 112, which presses the reinforcement protrusion 132, may be formed on an inner circumferential surface of the insertion groove 110a.

That is, as illustrated in FIG. 9, the base 131 is formed to extend along a circumference of an inflow pipe 10, and the reinforcement protrusion 132 is formed to extend from the base 131 in the axial direction of the branch pipe 20. In addition, when the insertion groove 110a, into which the reinforcement protrusion 132 is inserted, is formed in the body part 110, and the pressing surface 112 is formed on the inner circumferential surface of the insertion groove 110a to press the reinforcement protrusion 132, the fluid leakage around the branch hole 11 may be effectively prevented.

Figure 10:
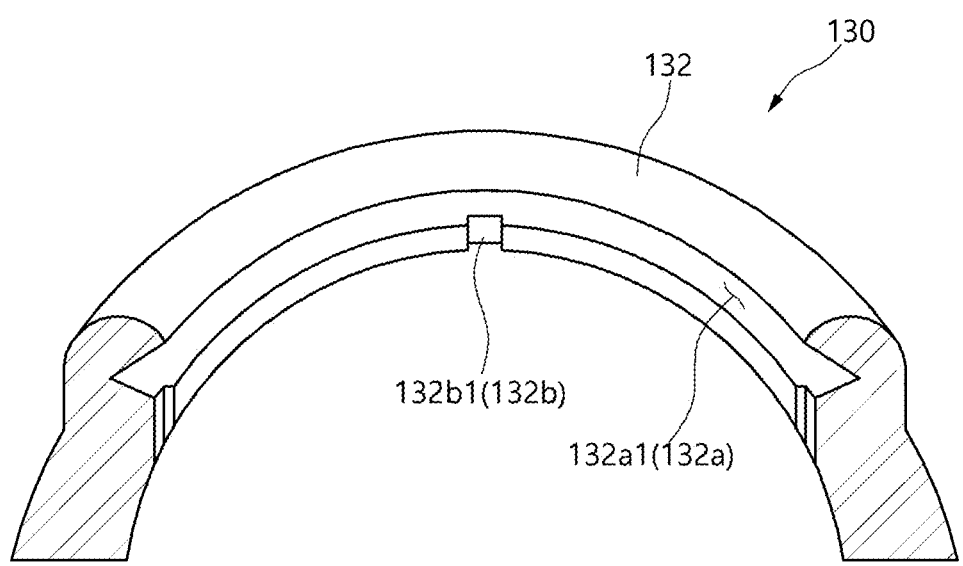
FIGS. 10 to 12 are cross-sectional views illustrating various gasket parts included in a coupling assembly according to still another embodiment of the present invention.

Here, as illustrated in FIGS. 10 to 12, an expansion groove 132a extending in a circumferential direction of a branch hole 11 may be formed in a reinforcement protrusion 132.

That is, as described above, while the reinforcement protrusion 132 is pressed by a pressing surface 112 formed on an inner circumferential surface of an insertion groove 110a, fluid leakage is prevented, but when the expansion groove 132a, into which a fluid is introduced, is formed in the reinforcement protrusion 132, and when the fluid is supplied while being used later, the fluid is introduced into the expansion groove 132a to elastically deform the reinforcement protrusion 132, and thus a pressing force by the pressing surface 112 increases relatively so that the fluid leakage may be more effectively prevented. In addition, a supply path 132b, which guides a fluid, is formed in the reinforcement protrusion 132 to introduce the fluid into the expansion groove 132a.

As illustrated in FIG. 10, an expansion groove 132a includes a first expansion groove 132a1 which is open in a circumferential direction of a branch pipe 20. That is, when a fluid is introduced into the first expansion groove 132a1 formed as described above, while a reinforcement protrusion 132 is elastically deformed in an axial direction of the branch pipe 20, a pressing force by an inner circumferential surface of an insertion groove 110a increases further.

In this case, a supply path 132b may include a first supply path 132b1 which guides the fluid so that the fluid is introduced into the first expansion groove 132a1, and since the first expansion groove 132a1 is formed in a side surface of the reinforcement protrusion 132, as illustrated in FIG. 10, a length of the first supply path 132b1 is formed to be short. In addition, since the length of the first supply path 132b1 is formed to be short, the fluid is quickly introduced into the first expansion groove 132a1 so that the fluid leakage can be quickly prevented.

Alternatively, as illustrated in FIG. 11, such an expansion groove 132a includes a second expansion groove 132a2 which is open in an axial direction of a branch pipe 20. That is, when a fluid is introduced into the second expansion groove 132a2 formed as described above, while a reinforcement protrusion 132 is elastically deformed in a circumferential direction of the branch pipe 20, a pressing force by inner circumferential surfaces of an insertion groove 110a increases further. Particularly, since a pair of inner circumferential surfaces, which are disposed opposite to each other, are formed in the insertion groove 110a, when the reinforcement protrusion 132 is elastically deformed as described above, an effect of preventing the fluid leakage is further improved by the pressing force by the pair of inner circumferential surfaces.

In this case, a supply path 132b may include a second supply path 132b2 which guides a fluid to introduce the fluid into the second expansion groove 132a2, and since the second expansion groove 132a2 is formed in an upper surface of the reinforcement protrusion 132, the second supply path 132b2 is formed to extend to guide the fluid to the second expansion groove 132a2.

That is, since a first expansion groove 132a1 is formed in a side surface of the reinforcement protrusion 132, the fluid may be quickly introduced thereinto, and thus there is the effect of quickly preventing the fluid leakage. In addition, since the second expansion groove 132a2 is formed in the upper surface of the reinforcement protrusion 132, when the fluid is introduced thereinto, the pair of inner circumferential surfaces disposed opposite to each other in the insertion groove 110a are pressed at the same time, and thus the effect of preventing the fluid leakage can be further improved.

In addition, as illustrated in FIG. 12, an expansion groove 132a may include a first expansion groove 132a1 which is open in a circumferential direction of a branch pipe 20 and a second expansion groove 132a2 which is open in an axial direction of the branch pipe 20.

That is, as described above, the first expansion groove 132a1 may quickly prevent fluid leakage, and the second expansion groove 132a2 may further improve an effect of preventing the fluid leakage. When the first expansion groove 132a1 and the second expansion groove 132a2 are formed together as described above, an amount of a fluid introduced into the expansion groove 132a increases to increase an amount of elastic change of a reinforcement protrusion 132, and thus a pressing force pressing inner circumferential surfaces of an insertion groove 110a increases so that the fluid leakage can be more effectively prevented in addition to the effects described above.

In this case, a supply path 132b may include a first supply path 132b1 which guides the fluid so that the fluid is introduced into the expansion groove 132a1 and a second supply path 132b2 which guides the fluid so that the fluid is introduced into the second expansion groove 132a2. That is, while the fluid is primarily supplied to the first expansion groove 132a1 through the first supply path 132b1, the fluid leakage may be quickly prevented, and while the fluid is introduced into the second expansion groove 132a2 through the second supply path 132b2 after the fluid is completely introduced into first expansion groove 132a1, a pair of inner circumferential surfaces formed in the insertion groove 110a are pressed so that the fluid leakage can be more effectively prevented.

That is, when the gasket part is formed as described above, not only the fluid leakage may be quickly prevented but also the fluid leakage can be more effectively prevented.

In this case, as illustrated in (b) of FIG. 8 and FIG. 9, an extension rib 134 extending in an axial direction of the inflow pipe 10 is formed on the base 131, a reinforcement part 114 into which the extension rib 134 is inserted is formed on the body part 110, and the pressing surface 112, which presses the extension rib 134, may be formed on an inner circumferential surface of the reinforcement part 114.

That is, as the extension rib 134 is formed to extend in the axial direction of the inflow pipe 10, and the pressing surface 112 is formed on the inner circumferential surface of the reinforcement part 114 to press the extension rib 134, the fluid leakage through the branch hole 11 may be more effectively prevented.

In this case, as illustrated in FIGS. 13 and 14, a support surface 114a extending in a radially inward direction of the inflow pipe 10 may be formed on the reinforcement part 114, and the support surface 114a may be pressed against and supported by an outer circumferential surface of the inflow pipe 10.

A sprinkler is installed on a rear end of the branch pipe 20 described above, a typical standard related to the sprinkler may include the standard of Underwriters Laboratories (UL) in the United States, and according to the standard of UL, it is required that fluid leakage should be effectively prevented when an external force is applied to the rear end of the branch pipe 20 in a direction parallel to the axial direction of the inflow pipe 10 in a state in which the sprinkler is installed. That is, even when a force is vertically applied to the branch pipe 20, the fluid leakage should be effectively prevented. To this end, when the support surface 114a, which extends in the radially inward direction of the inflow pipe 10 and is pressed against and supported by the outer circumferential surface of the inflow pipe 10 is formed on the reinforcement part 114 as described above, the fluid leakage can be effectively prevented even when an external force according the UL standard is applied.

In addition, when the support surface 114a is formed as described above, since the extension rib 134 formed on the base 131 is prevented from being exposed to the outside, deterioration of durability of the gasket part 130 can be effectively prevented.

While the embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

The invention claimed is:

1. A coupling assembly comprising:
an inflow pipe comprising a branch hole for branching of an introduced fluid;
a branch pipe in communication with the inflow pipe so that the fluid branched off through the branch hole flows; and
a coupler connecting the inflow pipe and the branch pipe,
wherein the coupler includes a body covering a circumference of the branch hole and comprising a guide rib inserted into the branch hole and a gasket disposed between the body and an outer circumferential surface of the inflow pipe, the gasket comprising a base pressed by a pressing surface of the body to prevent leakage of the fluid being branched off,
wherein a degree of pressurization against the gasket by the body increases in a direction away from the branch hole,
wherein the gasket comprises a reinforcement protrusion extending in an axial direction of the branch pipe,
wherein the reinforcement protrusion comprises one or more expansion grooves extending in a circumferential direction of the branch hole and one or more supply passages configured to guide the fluid so that the fluid is introduced into the one or more expansion grooves,
wherein the one or more expansion grooves comprise a first expansion groove provided on a side surface of the reinforcement protrusion and open in a radial direction of the branch pipe, and a second expansion groove provided on an upper surface of the reinforcement protrusion and open in the axial direction of the branch pipe,
wherein the one or more supply passages comprise a first supply passage configured to guide the fluid so that the fluid is primarily introduced into the first expansion groove and a second supply passage configured to guide the fluid so that the fluid is introduced into the second expansion groove after the fluid is introduced into the first expansion groove, and
wherein the first supply passage and the second supply passage are sequentially arranged along the axial direction.

2. The coupling assembly of claim 1, wherein:
the base comprises a reinforcement surface to increase the degree of pressurization by the pressing surface in the direction away from the branch hole.

3. The coupling assembly of claim 2, wherein a thickness of the reinforcement surface increases in the direction away from the branch hole.

4. The coupling assembly of claim 2, wherein:
the body comprises an insertion groove into which the reinforcement protrusion is inserted; and
the pressing surface, which is configured to press the reinforcement protrusion, is formed on an inner circumferential surface of the insertion groove.

5. The coupling assembly of claim 2, wherein:
the base comprises an extension rib extending in an axial direction of the inflow pipe;
the body comprises a reinforcement part configured to receive the extension rib; and
the pressing surface which is configured to press the extension rib is formed in an inner circumferential surface of the reinforcement part.

6. The coupling assembly of claim 5, wherein:
the reinforcement part comprises a support surface extending in a radially inward direction of the inflow pipe; and
the support surface is pressed against and supported by the outer circumferential surface of the inflow pipe.

* * * * *